United States Patent [19]

Wasmund et al.

[11] Patent Number: 5,168,022

[45] Date of Patent: Dec. 1, 1992

[54] METHOD OF PREPARING PHOTOCONDUCTIVE PIGMENTS BY TREATING α-FORM METAL-FREE PHTHALOCYANINE TO A LIQUID JET INTERACTION

[75] Inventors: Eric B. Wasmund, Hamilton; T. Edward Petroff, Kingston, both of Canada

[73] Assignee: Xerox Corporation, Stamford, Conn.

[21] Appl. No.: 636,251

[22] Filed: Dec. 31, 1990

[51] Int. Cl.⁵ .............................................. G03G 5/06
[52] U.S. Cl. ........................................ 430/58; 430/59; 430/78; 430/135; 540/122; 540/141
[58] Field of Search ................... 430/58, 78, 59, 135; 540/122, 141

[56] References Cited

U.S. PATENT DOCUMENTS

| | | | |
|---|---|---|---|
| 2,816,115 | 12/1957 | Howell | 260/314.5 |
| 3,357,989 | 12/1967 | Byrne et al. | 260/314.5 |
| 3,492,309 | 1/1970 | Ossanna | 260/314.5 |
| 3,594,163 | 7/1971 | Radler | 96/1.5 |
| 3,787,208 | 1/1974 | Jones | 96/1.8 |
| 4,507,374 | 3/1985 | Kakuta et al. | 430/56 |
| 4,533,254 | 8/1985 | Cook et al. | 366/176 |
| 4,552,838 | 11/1985 | Wey et al. | 430/56.9 |
| 4,619,879 | 10/1986 | Kakuta et al. | 430/58 |
| 4,783,389 | 11/1988 | Trout et al. | 430/137 |
| 4,786,570 | 11/1988 | Yu et al. | 430/58 |
| 4,814,441 | 3/1989 | Hauser et al. | 540/122 |
| 5,100,752 | 3/1992 | Hsaio et al. | 430/135 |

FOREIGN PATENT DOCUMENTS 2214922  2/1988  United Kingdom .

*Primary Examiner*—Marion E. McCamish
*Assistant Examiner*—Rosemary Ashton
*Attorney, Agent, or Firm*—Oliff & Berridge

[57] ABSTRACT

In a process for preparing a photoconductive pigment having a small particle size, a polymorph of a pigment is produced by a conversion process wherein a seed amount of the desired polymorph of the pigment and a larger amount of another polymorph of the pigment are subjected to a liquid jet interaction process.

20 Claims, 1 Drawing Sheet

METHOD OF PREPARING PHOTOCONDUCTIVE PIGMENTS BY TREATING α-FORM METAL-FREE PHTHALOCYANINE TO A LIQUID JET INTERACTION

BACKGROUND OF THE INVENTION

The present invention is generally directed to electrophotography, and, in particular, is directed to a process of preparing photoconductive pigments.

Photoconductive pigments are used, for example, in photogenerating layers of electrophotographic imaging members. Most phthalocyanine pigments are derived from solid forms of phthalocyanine which are characterized by a hard crystalline structure and, in the unprocessed state, lack pigmentary qualities. Processes of milling phthalocyanine to achieve a desired pigment form are known in the art. Even if ground to a particle size of a few microns, the phthalocyanine thus processed has little tinctorial strength. To achieve the pigmentary state, further processing is required. Generally, it has been necessary to grind the phthalocyanine into a state of fine subdivision and softness, for ease of dispersion in order that it may be incorporated easily into a pigmentary medium.

Phthalocyanine exists in many forms. Forms commonly used for the preparation of pigments are the α-form and the X-form.

The α-form of phthalocyanine and metal-free phthalocyanine having a substituent on the benzene nucleus are produced by conventional methods such as those disclosed in U.S. Pat. No. 4,619,879 to Kakuta et al. This patent describes methods of producing metal-free phthalocyanine, for example, by treating those metal-containing phthalocyanines whose metal can be removed with an acid such as sulfuric acid. Such phthalocyanines include lithium phthalocyanine, sodium phthalocyanine, calcium phthalocyanine, magnesium phthalocyanine and the like. It also describes producing metal-free phthalocyanine directly from phthalodinitrile, aminoiminoisoindolenine and alkoxyiminoisoindolenine. The metal-free phthalocyanine thus produced in accordance with these conventional methods is dissolved in sulfuric acid at a temperature preferably below 5° C., or converted into the sulfate and then poured into water or iced water for reprecipitation or hydrolysis, thereby providing the α-form metal-free phthalocyanine. The resulting α-form metal-free phthalocyanine produced by these methods is preferably used in the dry form, but a water paste type may also be used.

U.S. Pat. No. 3,357,989 to Byrne et al. discloses the utility of X-form phthalocyanine as a photoconductive material in electrophotography when mixed with a binder and coated on a substrate. The X-form is the most desirable form for use in preparing infrared-sensitive photogenerators.

U.S. Pat. No. 3,594,163 to Radler describes a method of preparing X-form phthalocyanine which comprises crystal conversion from α-form phthalocyanine in organic solvents seeded with small amounts of X-form phthalocyanine. In this procedure, up to 20% by weight of X-form phthalocyanine is added to particulate α-form phthalocyanine, and the mixture is converted to 100% X-form phthalocyanine by allowing a solution containing an organic binder resin to age for several hours, and then coating the solution onto a suitable substrate. The final product of this process is a hard layer comprising X-form phthaloyanine dispersed in a resin binder.

U.S. Pat. No. 4,783,389 to Trout et al. discloses a process for preparing toner particles for liquid electrostatic imaging wherein a thermoplastic resin is mixed with a nonpolar liquid at a temperature at which the resin will plasticize and liquify and below which the nonpolar liquid boils and the resin decomposes. The mixture is cooled to formed particles of the resin the nonpolar liquid, and the resin particles are then reduced in size by passing the mixture of resin particles and nonpolar liquid through at least one liquid jet interaction chamber.

A current method of effecting this conversion developed by the assignee of the present application uses a "seed" of the X-form phthalocyanine with a larger amount of the α-form. This mixture of the X-form "seed" and the α-form phthalocyanine then undergoes both dry and wet stone milling. The mixture of α-form and X-form pigment is ground in an attritor for approximately 24 hours, at which point 20–60% conversion is obtained. Conversion is then completed by forming a slurry of the mixture with a suitable solvent, and then separating the metal-free X-form phthalocyanine. In the event that methyl ethyl ketone is employed as the solvent, the period of time is 20–24 hours. The product is then washed, filter caked, and dried.

One disadvantage of this current process is the long time period required; generally this process takes about 2–3 days for 100% conversion to be effected. Additionally, the process is not readily amenable to scaling up, because of difficulties involved with performing this process on a larger scale. For example, it is possible for contaminants to be introduced during the grinding process when a foreign medium is employed to grind the material. For a large scale operation, it is also critical to utilize durable equipment which is not labor intensive in order to keep the costs of an upscale production low. It is also important to keep the processing time as short as possible to keep labor costs low and to maximize the efficiency of the equipment.

UK Patent 2,212,922A discloses a process of converting α-form phthalocyanine from X-form by subjecting a mixture of as little as 5% X-form phthalocyanine with the remainder being α-form phthalocyanine to ultrasonic radiation which effects the desired conversion in about two hours U.S. Pat. No. 2,816,115 to Howell teaches the production of phthalocyanine coloring material wherein crude α-form phthalocyanine coloring is milled with a comminuted water-insoluble solid grinding agent, i.e. fine sand, and sufficient water to convert the mixture into a stirrable viscous mass. The milling is done in an apparatus which causes the mass to undergo internal shear rather than impact, such as a disc mill.

U.S. Pat. No. 4,507,374 to Kakuta et al. discloses a process of manufacturing a form of phthalocyanine wherein metal-free phthalocyanine is subjected to milling by agitation or with a mechanical stress at 50° to 180° C. Typical devices for carrying out the crystal transformation process are ordinary agitating devices, such as a homomixer, a disperser, an agitator, a stirrer, a kneader, a Banbury mixer, a ball mill, a sand mill and an attritor.

While the prior art discloses several methods of preparing phthalocyanine, it fails to provide for obtaining phthalocyanine in a relatively short period of time with

SUMMARY OF THE INVENTION

It is an object of the present invention to provide a process for the polymorphic conversion of pigments which overcomes the shortcomings of the prior art.

It is an object of the present invention to provide a process for producing metal-free phthalocyanine wherein outside contaminants are minimized.

It is an object of the invention to provide a process for producing metal-free phthalocyanine which permits scaling up with minimal labor and which permits complete conversion in a very short time.

It is another object of the invention to provide a process for producing metal-free phthalocyanine in which the photoelectric properties of the product are superior to those resulting from the product formed by current procedures.

The present invention achieves these and other objects by providing a process for the polymorphic conversion of pigments by subjecting the pigment to a liquid jet interaction process. In a preferred embodiment, α-form metal-free phthalocyanine is seeded with a small amount of X-form metal-free phthalocyanine and is converted to 100% X-form metal-free phthalocyanine by a process in which a pigment slurry is formed of a mixture of the α-form metal-free phthalocyanine and X-form metal-free phthalocyanine dispersed in an organic solvent and the pigment slurry is converted in a liquid jet interaction process. The pigment slurry may then be washed, filtered and dried.

DETAILED DESCRIPTION OF PREFERRED EMBODIMENTS

Figure 1:
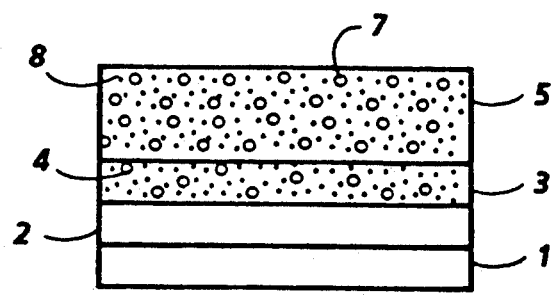
FIG. 1 is a partially schematic cross-sectional view of a photoresponsive imaging member in which the X-form metal-free phthalocyanine layer is situated between a substrate and a charge transport layer.

The present invention provides a process for producing the desired polymorph of a pigment by subjecting the pigment to a liquid jet interaction process. Pigments of a metal-free phthalocyanine useful as a photoconductive pigment may be formed by this process by converting α-form metal-free phthalocyanine to another form such as X-form metal-free phthalocyanine. Preferably, a mixture of α-form metal-free phthalocyanine is formed with a small amount of X-form metal-free phthalocyanine which acts as a "seed" for the conversion of a larger amount of the α-form to the X-form. The metal-free phthalocyanine mixture is combined with an aqueous or organic liquid in order to form a slurry, which is then subjected to stress in order to effect the conversion.

It has been found that the product formed by the above liquid jet interaction process possesses photoelectrical properties superior to those produced by the prior art. It is also believed that the liquid jet interaction process can be applied to the polymorphic conversion of metal phthalocyanines (e.g., vanadyl phthalocyanine, titanyl phthalocyanine) and other pigments (e.g., perylenes, perynones). The conversion process described herein has the advantage that the process is very clean and little contamination occurs, because the grinding forces are provided by the pigment particles themselves, and thus no contaminating components are present in the grinding process. A further advantage of this process is that the process is fully scalable, i.e., the process can be performed on a much larger scale without additional problems resulting from the mechanical or physical demands of performing the process on a larger scale.

One method of effecting this conversion is to process the slurry in a liquid jet interaction chamber, of the general description disclosed in U.S. Pat. No. 4,533,254, which is hereby incorporated by reference. A preferred apparatus is the MICROFLUIDIZER ® emulsifier, available from Microfluidics Corporation in Newtown, Mass. This device comprises a liquid jet interaction chamber block, comprising submerged nozzles providing elongated orifices arranged to eject under pressure thin sheets of a liquid system. The nozzles are arranged to effect turbulent jet interaction of the sheets along a common liquid jet interaction front and the sheets are ejected by the nozzles into a low pressure zone filled with the liquid, further creating turbulent jet interaction along a common boundary essentially defined and formed by the mixture in the low pressure zone and by the sheets ejected into the low pressure zone. It further comprises an inlet channel to deliver the liquid system under pressure to the nozzles, and a discharge channel to withdraw the liquid.

The device employs a high pressure (up to 20,000 psi) pump which forces the mixture of reactants in nonaqueous medium into the chamber where it is split into at least two streams which pass at a very high velocity through at least two slits and collide resulting in the particulation of the mixture into small particles. Generally, the reaction mixture is passed through the device once at a pressure between 5,000 psi and 15,000 psi. Multiple passes result in smaller average particle size and a narrower range for particle size distribution.

When the slurry of this invention is subjected to such a liquid jet interaction process, it is pumped into a chamber at a high velocity and pressure. The liquid slurry is then ejected under pressure through a plurality of elongated nozzles to form a plurality of thin sheets of the liquid mixture. The thin sheets are then forced to impinge along a common liquid jet interaction front in a zone of the liquid. Recycling of at least a predetermined portion of the slurry product through the nozzle may be carried out to reduce the size of the particles and/or to make them more nearly uniform.

This process produces a relatively smaller particle size with higher uniformity than is achieved by the wet stone milling of the prior art. Particle size can be adjusted by controlling the interaction intensity described above (e.g., velocity, pressure, and temperature). The resultant movement of the particles of the mixture against each other causes an effective grinding to occur. The particle size resulting from this process can be as low as 0.05 to 0.1 micrometers. Such a particle size is desirable because it results in both an effective conversion of the α-form to the X-form of metal-free phthalocyanine, as well as a good stable dispersion. Smaller particle sizes are also preferable because they exhibit better electrical properties.

The amount of X-form metal-free phthalocyanine used to seed the α-form/X-form mixture is approximately about 5% to about 30% by weight of said mixture; preferably, about 10% to about 20% is employed. Typical solvents for the slurry include ketones and alcohols; preferred solvents are methyl ethyl ketone and cyclohexanone.

The period of time required for the complete conversion described above ranges from about one-half hour to about 5 hours. Preferably, the conversion is effected in two to four hours.

It is possible to subject the pigment to further treatment to obtain a good dispersion of the pigment in a binder for coating a photoreceptor. In this step, the liquid jet interaction chamber may be used to redisperse the pigment by using as the slurry liquid a solvent into which the binder may be added during processing, or using the binder itself as the slurry liquid, thus providing direct production of the pigment-containing coating material.

The X-form metal-free phthalocyanine obtained by the process of this invention is useful as photogenerating pigment in photoconductive layered imaging members, which members can be comprised of, for example, a supporting substrate, the X-form metal-free phthalocyanine photogenerating layer, and a transport layer, especially an aryl amine transport layer. The purified photogenerating X-form metal-free phthalocyanine can be situated between the supporting substrate and the hole transport layer; or alternatively, the hole transport layer may be situated between the supporting substrate and the layer comprised of an X-form metal free photogenerating layer.

In another embodiment, the photoconductive imaging member is comprised of (1) a supporting substrate; (2) a hole blocking layer; (3) an optional adhesive interface layer; (4) a photogenerating layer comprised of the X-form metal-free phthalocyanine layer, and (5) a hole transport layer such as an aryl amine layer. More specifically, this photoconductive imaging member is comprised of a conductive supporting substrate, a hole blocking organo silane or siloxane, or metal oxide layer in contact therewith, an adhesive layer, such as polyester or polyvinylbutyral, a photogenerating layer comprised of the X-form metal-free phthalocyanine obtained with the process of the present invention, and thereover certain aryl amines dispersed in a resinous binder.

Various known processes can be selected for the preparation of photoconductive imaging members, the process parameters and the order of coating of the layers being dependent on the member desired. In one embodiment, the layered photoconductive device can be prepared by providing the conductive substrate containing the hole blocking layer and an optional adhesive layer, and applying thereto by solvent coating processes, laminating processes, or other methods, the X-form metal-free phthalocyanine photogenerating layer, and the charge transport layer comprised preferably of an aryl amine.

The photoconductive imaging members can be incorporated into numerous imaging processes and apparatuses well-known in the art, such as xerographic imaging and printing processes. Specifically, the imaging members of the present invention are useful in xerographic imaging processes. In these processes, electrostatic latent images are initially formed on the imaging member, are developed, and the developed image is then transferred to a suitable substrate and fixed thereto by, for example, heat, or a combination of heat and pressure.

Illustrated in FIG. 1 is a photoresponsive imaging member of the present invention comprised of a substrate 1, an adhesive layer 2, a photogenerator layer 3 comprised of the X-form metal-free phthalocyanine obtained by the process of the present invention optionally dispersed in a resinous binder composition 4, and a charge carrier hole transport layer 5 comprised of an aryl amine such as N,N'-bis(3-methylphenyl)-(1,1'-biphenyl)-4,4'-diamine 7 dispersed in a polycarbonate resinous binder 8.

Figure 2:
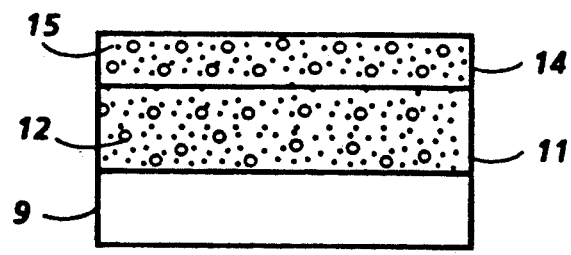
FIG. 2 is a partially schematic cross-sectional view of a photoresponsive imaging member in which a charge transport layer is situated between the X-form metal-free photogeneration layer and a substrate.

Illustrated in FIG. 2 is a photoresponsive imaging member in which the hole transport layer is situated between the supporting substrate and the photogenerating layer. More specifically, with reference to this Figure there is illustrated a photoconductive imaging member comprised of a supporting substrate 9, a hole transport layer 11 comprised of an aryl amine hole transport composition dispersed in an inactive resinous binder composition 12, and a photogenerating layer 14 comprised of X-form metal-free phthalocyanine obtained by the process of the present invention illustrated herein optionally dispersed in a resinous binder composition 15.

Within the imaging members, the substrates may comprise a layer of insulating material such as an inorganic or organic polymeric material, including Mylar, a commercially available polymer; a layer of an organic or inorganic material having a semiconductive surface layer such as indium, tin oxide or aluminum arranged thereon, or a conductive material such as, for example, aluminum, chromium, nickel, titanium, brass, or the like. The substrate may be flexible, seamless or rigid and may have different configurations, such as, for example, a plate, a cylindrical drum, a scroll, an endless flexible belt, and the like. Preferably, the substrate is in the form of an endless flexible belt. In some situations, it may be desirable to coat on the back of the substrate, particularly when the substrate is an organic polymeric material, an anticurl layer, such as, for example, polycarbonate materials commercially available as Makrolon. The thickness of the substrate layer depends on many factors, including economic considerations; thus this layer may be of substantial thickness, for example over 100 mils, or of minimum thickness providing there are no adverse effects on the system. In a preferred embodiment, the thickness of this layer is from about 3 mils to about 10 mils.

The optional adhesive layers are typically comprised of a polymeric material including polyesters, polyvinyl butyral, polyvinyl pyrrolidone, polyurethane, polyamide and the like. Typically, this layer is of a thickness of less than about 5 microns. The imaging member can include other layers therein including metal oxide layers, such as aluminum oxide and siloxanes, as disclosed in U.S. Pat. No. 4,464,450, the disclosure of which is incorporated herein by reference. Generally, the thickness of these layers is from about 0.01 to about 1 micron; however, other thicknesses may be selected.

The layer comprised of X-form metal-free phthalocyanine photogenerating pigments obtained by the process of the present invention is generally of a thickness of from about 0.05 micron to about 10 microns or more, and preferably is of a thickness of from about 0.1 micron to about 3 microns; however, the thickness of this layer is primarily dependent on the photogenerator weight loading which may vary from about 5 to about 100 percent. Various suitable polymeric binders can be selected for the X-form metal-free phthalocyanine photogenerating layer. Examples of resin binders include polycarbonate, polyesters, polyvinylbutyral, polyvinylacetate, polyvinylcarbazole, polyacrylate, polystyrene, their copolymers, and the like. Generally, it is desirable to provide this layer in a thickness which is sufficient to absorb about 90 percent or more of the incident radiation which is directed upon it, and the imagewise or printing exposure step. The maximum thickness of this layer is dependent primarily upon factors such as mechanical considerations, for example, whether a flexible photoconductive imaging member is desired, and the thicknesses of the other layers.

Various suitable hole transport components, such as aryl amine charge transport layers, can be selected for the photoconductive imaging members, such layers may have a thickness, for example, of from about 5 microns to about 75 microns, and preferably are of a thickness of from about 10 microns to about 40 microns. In a preferred embodiment, a transport layer comprises aryl amine molecules of the following formula:

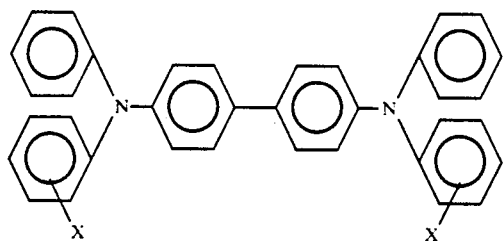

dispersed in a highly insulating and transparent organic resinous binder wherein X is selected from the group consisting of alkyl and halogen, and preferably (ortho)-$CH_3$, (meta)-$CH_3$, (para)-$CH_3$, (ortho)-Cl, (meta)-Cl, or (para)-Cl.

Aryl amines encompassed by the above formula include, for example, N,N'-diphenyl-N,N'-bis(alkylphenyl)-4,4'-diamine wherein the alkyl is selected from the group consisting of methyl (such as 2-methyl, 3-methyl, and 4-methyl), ethyl, propyl, butyl, hexyl, and the like. With halo substitution, the amine is N,N'-diphenyl-N,N'-bis-(halophenyl)-(1,1'-biphenyl)-4,4'-diamine wherein halo is 2-chloro, 3-chloro, or 4-chloro.

Examples of the highly insulating and transparent resinous material or inactive binder resinous material for the photogenerating or transport layers include materials such as those described in U.S. Pat. No. 3,121,006, which is hereby incorporated by reference. Specific examples of organic resinous materials, especially for the transport layer, include polycarbonates, acrylate polymers, vinyl polyurethanes, polystyrene, and epoxies as well as block random or alternating copolymers thereof. Preferred electrically inactive binder materials for the charge transport layer are polycarbonate resins having a molecular weight ($M_w$) of from about 20,000 to about 100,000 with a molecular weight in the range of from about 50,000 to about 100,000 being particularly preferred. Generally, the charge transport layer contains from about 10 to about 75 percent by weight of the charge transport material corresponding to the foregoing formula, and preferably from about 35 percent to about 50 percent of this material.

Also, methods of imaging can be accomplished with the photoconductive imaging members illustrated herein. These methods generally involve the formation of an electrostatic latent image on the imaging member, followed by developing the image with known developer compositions, as disclosed in U.S. Pat. Nos. 3,590,000, 4,469,770, 4,560,635 and 4,298,672, the disclosures of which are incorporated herein by reference; subsequently transferring the image to a suitable substrate; and permanently affixing the image thereto.

The invention will further be illustrated in the following, non-limiting examples, it being understood that these examples are intended to be illustrative only and that the invention is not intended to be limited to the materials, conditions, process parameters, and the like recited herein.

EXAMPLE 1

A slurry of 8 g of the α polymorph of metal-free phthalocyanine and 2 g of seed X-form metal-free phthalocyanine is placed in 400 ml of cyclohexanone, and processed in a Microfluidics Corporation MFC-M110Y Microfluidizer ® equipped with 2 ceramic interaction chambers. The procedure is carried out at an external dynamic pressure of 100 psi for 3 hours. After 3 hours, the resulting pigment has converted to 95% of the X-form, as determined by X-ray diffraction. In order to obtain 100% conversion, the slurry is then ground by stone milling for 4 hours to obtain 100% conversion, and the product is washed and dried. The xerographic electrical properties of this X-form metal-free phthalocyanine pigment sample are determined as reported in Example 3, Tables 1 and 2.

EXAMPLE 2

A slurry of 8 g of the α polymorph of metal-free phthalocyanine and 2 g of seed X-form metal-free phthalocyanine is placed in 400 ml of methyl ethyl ketone (MEK), and processed in a Microfluidics Corporation MFC-M110Y Microfluidizer ® equipped with 2 ceramic interaction chambers. The procedure is carried out at an external dynamic pressure of 100 psi for 3 hours. After 3 hours, the resulting pigment has converted to 100% of the X-form, as determined by X-ray diffraction. The xerographic electrical properties of this X-form metal-free phthalocyanine pigment sample are determined as reported in Example 3, Tables 3 and 4.

EXAMPLE 3

Two layered photoresponsive imaging members containing an X-form metal-free phthalocyanine photogenerator layer and an arylamine transport layer are fabricated. The pigment dispersion used for coating the photogenerator layer is prepared as follows in each instance: 0.25 gram of polyvinylbutyral polymer is dissolved in 14.2 grams of cyclohexanone in a 30 ml glass bottle. 0.25 gram of the X-form metal-free phthalocyanine pigments of Example 1 and 2 and 70 grams of ⅛ inch stainless steel balls are added to the polymer solution. The bottle is placed on a roller mill and the dispersion is milled for 20 hours. The solution for coating the aryl amine transport layer is prepared by dissolving, with the aid of a magnetic stirrer, 4.45 grams of N,N'-diphenyl-N-N'-bis(3-methylphenyl)-(1,1'-biphenyl)-4-4'-diamine, and 8.3 grams of polycarbonate in 51.65 grams of toluene in a 120 ml bottle.

The X-form metal-free phthalocyanine dispersion of both examples is coated onto a 3 mil aluminum metallized Mylar substrate using a film applicator of 1 mil gap. The X-form metal-free phthalocyanine photogenerator layer formed is dried in a forced air oven at 120° for 10 minutes and has a final thickness of about 0.35 microns. The charge transport layer solution is then coated onto the photogenerator layer using a film applicator of 10-mil gap. The resulting member is then dried at 120° for 1 hour. The charge transport layer is approximately 25 microns thick.

The electrical results for these imaging members are determined by electrostatically charging the surfaces thereof with a corona discharge source until the surface potentials, as measured by a capacitively coupled probe attached to an electrometer, attain an initial value $V_o$ of about $-300$ volts. After resting for 0.5 second in the dark, the charged material reaches a surface potential of $V_{ddp}$, dark development potential, and each member is then exposed to light from a filtered Xenon lamp with an XBO 150 watt lamp. A reduction in surface potential to a $V_{bg}$ value, background potential, due to photodischarge effect is observed. The dark decay in volt/second is calculated as $(V_o - V_{ddp})/0.5$. The percent of photodischarge is calculated as 100 percent $(V_{ddp} - V_{bg})/V_{ddp}$. The desired wavelength and energy of the exposed light is determined by the type of filters placed in front of the lamp. The photodischarge characteristics of these imaging members are measured with a narrow-band pass filter of 800 nanometers. A photodischarge curve is then constructed by plotting values of the photodischarge percentage against the corresponding expose energy. From the curve, various photosensitivity values can be determined. Half-discharge energy, commonly designated as $E_{\frac{1}{2}}$ value, is the amount of expose energy required to achieve 50% of photodischarge from the dark development potential. The higher the photosensitivity, the smaller is the $E_{\frac{1}{2}}$ value. Additionally, the photodischarge percentages observed at expose energies of 10 and 20 erg/cm² are also used to describe the photosensitivity.

Tables 1 and 2 summarize the xerographic electricals of the material containing x-form metal-free phthalocyanine prepared with cyclohexanone (Example 1).

TABLE 1

| | Photosensitivity Test | | | |
|---|---|---|---|---|
| | $V_g$ | D.D. V/s | $E_{\frac{1}{2}}$ erg/cm² | % dis. @ 10 erg/cm² | % dis. @ 20 erg/cm |
| Stone Milled (control) | 310 | 14 | 4.1 | 70 | 77 |
| Liquid Jet Interaction | 310 | 10 | 2.8 | 75 | 80 |

TABLE 2

| | Cyclic Test | | | |
|---|---|---|---|---|
| | Vddp cycle #200 (Volts) | $\Delta V_{ddp}$ (Volts) | $V_r$ cycle #200 (Volts) | $\Delta V_r$ (Volts) |
| Stone Milled (control) | 318 | $-24$ | 27 | $+2$ |
| Liquid Jet Interaction | 334 | $-11$ | 28 | $+2$ |

The results in Table 3 and Table 4 show that the sample prepared with methyl ethyl ketone has better electrical properties than those of the control, stone milled sample.

TABLE 3

| | Photosensitivity Test | | | |
|---|---|---|---|---|
| | $V_g$ | D.D. V/s | $E_{\frac{1}{2}}$ erg/cm² | % dis. @ 10 erg/cm² | % dis. @ 20 erg/cm |
| Stone Milled (control) | 320 | 16 | 4.1 | 69 | 72 |
| Liquid Jet Interaction | 330 | 21 | 3.4 | 78 | 78 |

TABLE 4

| | Cyclic Test | | | |
|---|---|---|---|---|
| | Vddp cycle #200 (Volts) | $\Delta V_{ddp}$ (Volts) | $V_r$ cycle #200 (Volts) | $\Delta V_r$ (Volts) |
| Stone Milled (control) | 296 | $-28$ | 36 | $+1$ |
| Liquid Jet Interaction | 315 | $-14$ | 40 | $+3$ |

The overall results of all examples are that, for a given solvent, microfluidization gives equal or better properties than stone milling.

Although the invention has been described with reference to specific preferred embodiments, it is not limited thereto; rather, those skilled in the art will recognize that variations and modifications can be made which are within the spirit of the invention and within the scope of the claims.

What is claimed is:

1. A photoreceptor coating material containing X-form metal-free phthalocyanine pigment, said coating material being formed by a process comprising:
   subjecting α-form metal-free phthalocyanine and a seed amount of X-form metal-free phthalocyanine in the form of a slurry with an organic liquid to a liquid jet interaction process to convert α-form metal-free phthalocyanine to X-form metal-free phthalocyanine, wherein the liquid jet interaction process comprises the steps of:
   splitting the slurry into at least two streams; and
   ejecting each slurry stream from at least one nozzle at high pressure and high velocity such that the at least two ejected slurry streams collide, an impact of the collision of the at least two ejected slurry streams providing sufficient force to both reduce a particle size of the pigments, and to cause polymorphic conversion of the α-form metal-free phthalocyanine pigment to the X-form phthalocyanine pigment;
   isolating said X-form metal-free phthalocyanine from said first slurry; and
   mixing said isolated X-form metal-free phthalocyanine with an organic binder.

2. The photoreceptor coating material according to claim 1, wherein the X-form metal free phthalocyanine pigment is in the form of particles having a particle size of 0.05 to 0.1 μm.

3. A photoreceptor comprising a photoreceptor coating material containing X-form metal-free phthalocyanine pigment and a charge transport layer, said coating material being formed by a process comprising:
   subjecting α-form metal-free phthalocyanine and a seed amount of X-form metal-free phthalocyanine in the form of a slurry with an organic liquid to a liquid jet interaction process to convert the α-form metal-free phthalocyanine to X-form metal-free phthalocyanine, wherein the liquid jet interaction process comprises the steps of:

splitting the slurry into at least two streams; and ejecting each slurry stream from at least one nozzle at high pressure and velocity such that the at least two ejected slurry streams collide, an impact of the collision of the at least two ejected slurry streams providing sufficient force to both reduce a particle size of the pigments, and to cause polymorphic conversion of the α-form metal-free phthalocyanine pigment to the X-form metal-free phthalocyanine pigment;

isolating said X-form metal-free phthalocyanine from said first slurry; and mixing said isolated X-form metal-free phthalocyanine with an organic binder composition.

4. A photoreceptor of claim 3, further comprising a supporting substrate comprised of a conductive substance.

5. A photoreceptor of claim 4, wherein the supporting substrate is aluminum, an organic polymeric composition, aluminized Mylar or titanized Mylar.

6. A photoreceptor of claim 3, wherein the X-form metal-free phthalocyanine is dispersed in a resinous binder in an amount of from about 5 percent by weight to about 95 percent by weight.

7. A photoreceptor of claim 6, wherein the resinous binder is a polyester, polyvinylbutyral, polycarbonate, polyvinylformyl, polyvinylcarbazole, polyvinylchloride, or mixture thereof.

8. A photoreceptor of claim 3, comprised of (1) a supporting substrate; (2) a siloxane hole blocking layer; (3) a photogenerating layer comprised of said X-form metal-free phthalocyanine; and (4) an aryl amine hole transport layer.

9. A photoreceptor of claim 8, wherein there is included between the siloxane hole blocking layer and the photogenerating layer an adhesive layer.

10. A photoreceptor of claim 9, wherein the adhesive layer is a polyester resin.

11. The process for inducing polymophic conversion of an α-form metal-free phthalocyanine pigment to form a polymorphically converted pigment, comprising the steps of:

forming a slurry comprising said α-form metal-free phthalocyanine pigment, a seed amount of said polymorphically converted pigment and an organic liquid; and subjecting the slurry to a liquid jet interaction process, wherein the liquid interaction process comprises the steps of:

splitting the slurry into at least two slurry streams; and ejecting each slurry stream from at least one nozzle at a high pressure and high velocity, such that the at least two ejected slurry streams collide, an impact of the collision of the at least two ejected slurry streams providing sufficient force to both reduce a particle size of the pigments and to cause polymorphic conversion of the α-form metal-free phthalocyanine pigment to the polymorphically converted pigment.

12. The process of claim 11, wherein said seed amount is about 5% to about 30% by weight of said mixture of pigment and polymorphically converted pigment.

13. The process of claim 11, wherein said polymorphically converted pigment is X-form phthalocyanine.

14. The process of claim 13, wherein said liquid jet interaction process is carried out for a time of about one-half hour to about five hours.

15. An X-form phthalocyanine produced by the process of claim 13.

16. The process of claim 11, wherein the organic liquid is selected from the group consisting of ketones and alcohols.

17. The process of claim 16, wherein the organic liquid is selected from the group consisting of methyl ethyl ketone, methyl isobutyl ketone and cyclohexanone.

18. The process of claim 11, further comprising isolating said X-form phthalocyanine converted by said liquid jet interaction process from said slurry.

19. An X-form phthalocyanine produced by the process of claim 11.

20. The process according to claim 11, wherein the particle size of said pigment is from 0.05 to 0.1 μm.

* * * * *